United States Patent
Kim et al.

(10) Patent No.: US 12,439,362 B2
(45) Date of Patent: Oct. 7, 2025

(54) COMMUNICATION DEVICE AND OPERATING METHOD THEREOF

(71) Applicant: NXP B.V., Eindhoven (NL)

(72) Inventors: Boyoung Kim, Graz (AT); Michael Schober, Graz (AT); Robert Spreitzer, Graz (AT); Nidhin Vadakkan, Mahe (IN); Srivathsa Masthi Parthasarathi, Bangalore (IN)

(73) Assignee: NXP B.V., Eindhoven (NL)

( * ) Notice: Subject to any disclaimer, the term of this patent is extended or adjusted under 35 U.S.C. 154(b) by 659 days.

(21) Appl. No.: 17/817,419

(22) Filed: Aug. 4, 2022

(65) Prior Publication Data

US 2023/0065013 A1 Mar. 2, 2023

(30) Foreign Application Priority Data

Sep. 2, 2021 (EP) ..................... 21194547

(51) Int. Cl.
*H04W 64/00* (2009.01)
*H04W 56/00* (2009.01)
*H04W 72/56* (2023.01)

(52) U.S. Cl.
CPC ....... *H04W 64/00* (2013.01); *H04W 56/0005* (2013.01); *H04W 56/003* (2013.01); *H04W 72/56* (2023.01)

(58) Field of Classification Search
CPC ............. H04W 64/00; H04W 56/0005; H04W 56/003; H04W 72/56; G07C 2009/00769; G07C 9/00309; G01S 13/765; G01S 13/785

USPC ...................................................... 455/456.1
See application file for complete search history.

(56) References Cited

U.S. PATENT DOCUMENTS

| | | | | |
|---|---|---|---|---|
| 10,486,646 | B2* | 11/2019 | Ledvina | ................ H04W 12/50 |
| 11,828,832 | B2* | 11/2023 | Henry | ..................... G01S 5/145 |
| 11,930,512 | B2* | 3/2024 | Lee | ......................... H04W 72/30 |
| 2015/0200706 | A1 | 7/2015 | Bottazzi et al. | |
| 2020/0015038 | A1 | 1/2020 | Burugupalli et al. | |

(Continued)

FOREIGN PATENT DOCUMENTS

| EP | 3670275 A1 | 6/2020 |
|---|---|---|
| WO | 2019/067105 A1 | 4/2019 |
| WO | 2021/025389 A1 | 2/2021 |

OTHER PUBLICATIONS

Amendments received before examination dated Mar. 28, 2022 for EP 21194547 (Year: 2022).*

(Continued)

*Primary Examiner* — Juan A Torres (57) ABSTRACT

A communication device and a corresponding device operating method include an ultra-wideband (UWB) communication unit enabling UWB communication with at least one external communication device, and a processing unit performing a ranging session between the communication device and the external communication device. The ranging session includes one or more distance measurements based on messages exchanged between the communication device and the external communication device. The messages are exchanged through the UWB communication unit. The device also includes a prioritization unit configured to prioritize the ranging session using a synchronization indicator associated with the ranging session.

19 Claims, 10 Drawing Sheets

(56) References Cited

U.S. PATENT DOCUMENTS

| | | | | |
|---|---|---|---|---|
| 2020/0150262 A1* | 5/2020 | Kim | .................. | H04W 76/40 |
| 2020/0182996 A1* | 6/2020 | Lee | .................. | G01S 13/785 |
| 2020/0204203 A1* | 6/2020 | de Perthuis | ........ | G07C 9/00309 |
| 2022/0070613 A1* | 3/2022 | Barton | .................. | G01S 5/0236 |
| 2022/0099818 A1* | 3/2022 | Werner | .................. | G01S 13/46 |
| 2022/0139133 A1 | 5/2022 | Schober et al. | | |
| 2022/0225056 A1* | 7/2022 | Glover | .................. | H04W 4/46 |
| 2022/0386214 A1* | 12/2022 | Kim | .................. | G01S 5/10 |

OTHER PUBLICATIONS

Amended claims filed after receipt of European search report dated Mar. 28, 2022 for EP 21194547 (Year: 2022).*
European search opinion dated Feb. 25, 2022 for EP 21194547. (Year: 2022).*
Jones, Elden F. II; "Scheduling 101—the basic of best practices"; Paper presented at PMI® Global Congress 2009—North America, Orlando, Florida; Project Management Institute; Scheduling, Work Breakdown Structures Oct. 13, 2009; Internet: https://www.pmi.org/learning/library/schedule-101-basic-best-practices-6701.
Liu, Kuang-Hao et al.; "Exclusive-Region Based Scheduling Algorithms for UWB WPAN"; Published in IEEE Transactions on Wireless Communications, vol. 7, No. 3; Mar. 2008; DOI: 10.1109/TWC.2008.060707.

* cited by examiner

COMMUNICATION DEVICE AND OPERATING METHOD THEREOF

CROSS-REFERENCE TO RELATED APPLICATIONS

This application claims priority under 35 U.S.C. § 119 to European Patent Application No. 21194547.2, filed on Sep. 2, 2021, the contents of which are incorporated by reference herein.

TECHNICAL FIELD

The present disclosure relates to a communication device. Furthermore, the present disclosure relates to a corresponding method of operating a communication device, and to a computer program for carrying out said method.

BACKGROUND

Ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices.

SUMMARY

In accordance with a first aspect of the present disclosure, a communication device is provided, comprising: an ultra-wideband (UWB) communication unit configured to enable UWB communication with at least one external communication device; a processing unit configured to perform a ranging session between the communication device and the external communication device, wherein said ranging session comprises one or more distance measurements based on messages exchanged between the communication device and the external communication device, wherein said messages are exchanged through the UWB communication unit; a prioritization unit configured to prioritize said ranging session using a synchronization indicator associated with said ranging session.

In one or more embodiments, said synchronization indicator indicates whether or not the ranging session is in a synchronized state.

In one or more embodiments, the prioritization unit is configured to increase the priority of the ranging session for a predefined amount of time if the ranging session is not in a synchronized state.

In one or more embodiments, the predefined amount of time corresponds to a predefined amount of blocks of the ranging session.

In one or more embodiments, the ranging session is in a synchronized state if the UWB communication unit has received a message with a predefined content from the external communication device, and the ranging session is not in a synchronized state if the UWB communication unit has not received said message.

In one or more embodiments, the predefined content includes synchronization data preceding a ranging round.

In one or more embodiments, the prioritization unit is further configured to prioritize said ranging session using a scheduling indicator associated with said ranging session.

In one or more embodiments, the scheduling indicator indicates whether or not the ranging session has been scheduled in a predefined time window.

In one or more embodiments, the prioritization unit is configured to increase the priority of the ranging session for a predefined amount of time if the ranging session has not been scheduled in said predefined time window.

In one or more embodiments, the predefined amount of time corresponds to a predefined amount of blocks of the ranging session.

In one or more embodiments, the device is configured to act as a responder in a localization system.

In accordance with a second aspect of the present disclosure, a method of operating a communication device is conceived, comprising: enabling, by an ultra-wideband, UWB, communication unit comprised in said communication device, UWB communication with at least one external communication device; performing, by a processing unit comprised in said communication device, a ranging session between the communication device and the external communication device, wherein said ranging session comprises one or more distance measurements based on messages exchanged between the communication device and the external communication device, wherein said messages are exchanged through the UWB communication unit; prioritizing, by a prioritization unit comprised in said communication device, the ranging session using a synchronization indicator associated with said ranging session.

In one or more embodiments, said synchronization indicator indicates whether or not the ranging session is in a synchronized state.

In one or more embodiments, the prioritization unit increases the priority of the ranging session for a predefined amount of time if the ranging session is not in a synchronized state.

In accordance with a third aspect of the present disclosure, a computer program is provided, comprising executable instructions which, when executed by a communication device, cause said communication device to carry out a method of the kind set forth.

DESCRIPTION OF DRAWINGS

Embodiments will be described in more detail with reference to the appended drawings, in which.

DESCRIPTION OF EMBODIMENTS

As mentioned above, ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices.

Accordingly, UWB technology may be used to measure the distance between a UWB communication device whose position should be tracked (for example, a mobile device that functions as a key for accessing a vehicle or opening a door) and one or more UWB communication devices which are used to track said position (for example, UWB anchors embedded in a vehicle or a door). Typically, distance measurements are performed during UWB communication sessions referred to as a ranging sessions. A typical UWB-based ranging session includes one or more messages (i.e., frames that are part of a distance estimation sequence) transmitted from a UWB communication device (which may also be referred to as a "reader") to one or more other UWB communication devices, as well as one or more messages in response to those frames, which are transmitted back to the communication device by the other communication device. It is noted that, depending on the role assigned to the communication device and the other communication devices in this message exchange, either the communication device may act as an "initiator" or "controller" (in which case the other communication devices act as "responders" or "controlees") or the communication device may act as a "responder" or "controlee" (in which case the other communication devices act as "initiators" or "controllers").

Accordingly, an important application of UWB to perform accurate distance measurements. Since modern location-aware devices should support multiple applications at the same time, also multiple distance measurement sessions (i.e., ranging sessions) should be supported at the same time. Implementing a scheduler is a common way of managing the execution of multiple ranging sessions. For instance, a typical scheduler has a task (e.g., a distance measurement session) and its priority as input.

Figure 1:
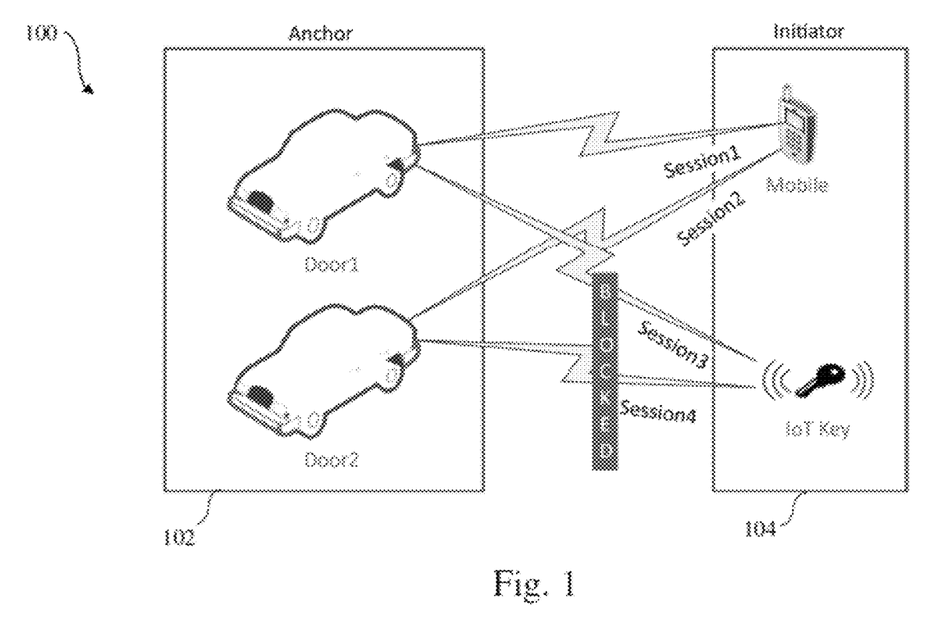
FIG. 1 shows an example of a localization system.

FIG. 1 shows an example of a localization system 100. In particular, an example is shown of a UWB-based door access system comprising two doors acting as anchors or responders 102 and two digital keys acting as initiators 104 (e.g., a key, phone or tag). All the devices have a UWB interface which can be used for a distance measurement. Both keys have two active ranging sessions (i.e., applications) running, one session for ranging with UWB Door1 and one session for ranging with UWB Door2. For being able to range with both doors the keys have a scheduler implemented that is scheduling between Door1 and Door2. For having a good user experience the door should open within 200 milliseconds after the key has entered a radius of less than one meter to the door. If multiple sessions are configured, it is likely that the configured sessions collide with each other. If the sessions collide and want to trigger an action (e.g., a ranging operation) at the same time only the action (e.g., ranging operation) of one session can be executed. In this example depending on the session priority, one of the two sessions will be scheduled more often than the other one. Since every door has a corresponding UWB session priority, the priority parameter can be used as a decision criterion for scheduling a ranging with one door more often than with the other door. For example, if Door1 has a higher priority than Door2, Door1 will be scheduled more often, which leads to a better user experience if somebody approaches Door1 with a UWB-enabled key. Unfortunately, this leads to a worse user experience if somebody with a key approaches Door2, because this door is scheduled less often because of the lower priority. Especially if a smart door opening system consists of multiple doors and the key has to support also other UWB-based applications, a static scheduling priority scheme may lead to an inefficient scheduling from a user experience perspective (e.g., a door does not open for a second), because of continuing collisions with sessions of a higher priority. This inefficiency may become even larger if any of the doors is waiting for two keys. During this time, the door does not know exactly when the keys will send their first UWB message for synchronization. This means that the door should wait for a long time until the messages from the initiator are received. While waiting for the initiator, the session occupies the device for a long time to get the first UWB message, which is blocking all the other sessions running on the device. For instance, even if a lower priority key starts first, the door will keep waiting for the higher priority keys. So, the door cannot synchronize with the lower priority key properly until it has synchronized with the higher priority key.

Figure 2:
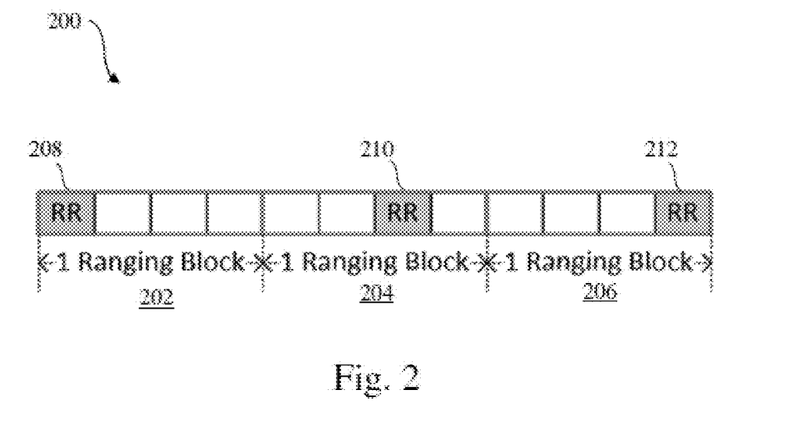
FIG. 2 shows an example of block-based ranging.

FIG. 2 shows an example of block-based ranging 200. In a block-based ranging scheme, ranging may be performed continuously at predefined moments within ranging blocks 202, 204, 206. In particular, so-called ranging rounds 208, 210, 212 may be performed as said predefined moments within the ranging blocks 202, 204, 206.

Figure 3:
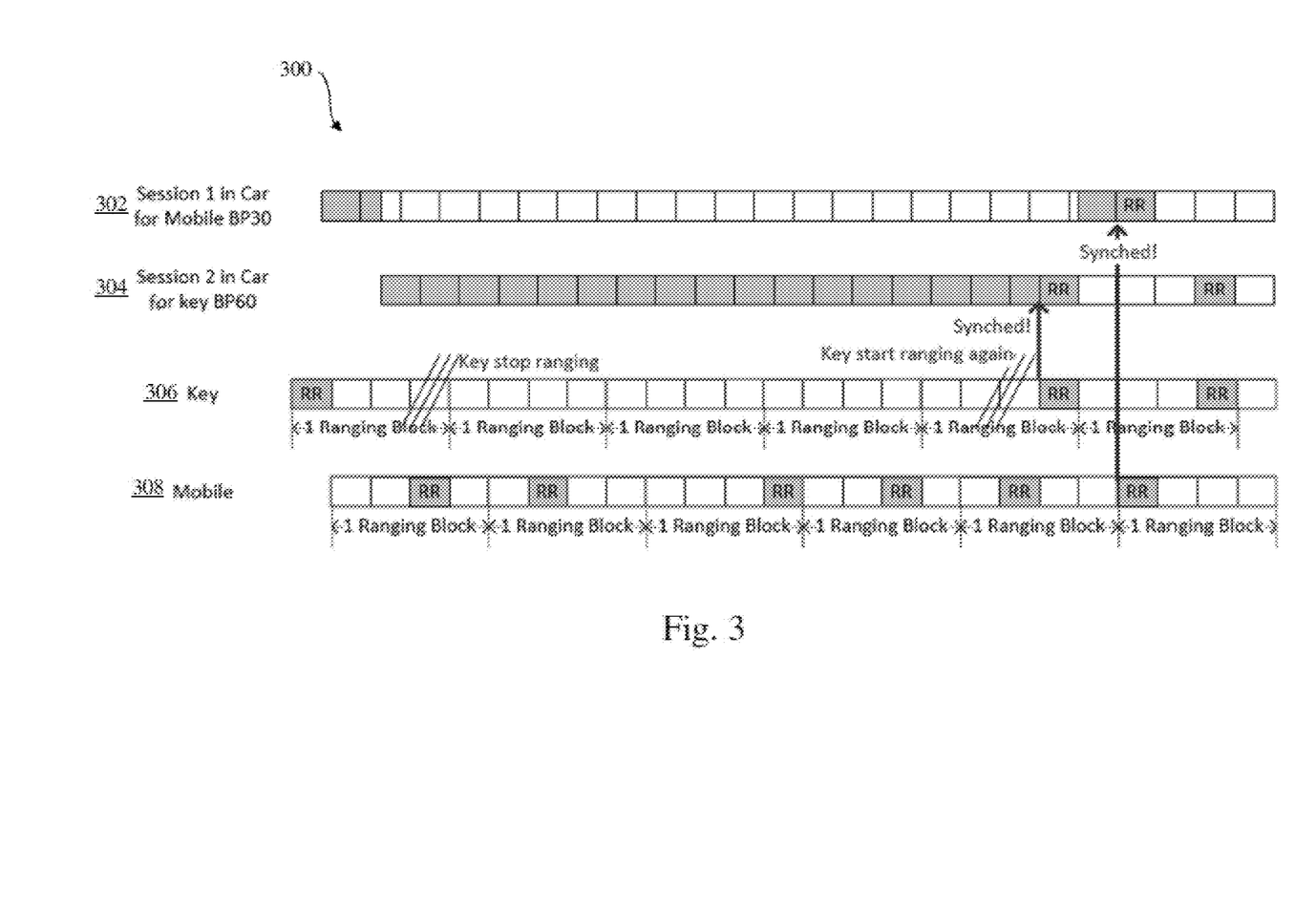
FIG. 3 shows an example of static priority ranging with multiple sessions.

FIG. 3 shows an example of static priority ranging 300 with multiple sessions 302, 304. Before a synchronization between an initiator and a responder, the responder may not know exactly when the initiator will start a ranging or at which ranging round the initiator will perform a ranging. In order to receive the first UWB signal from the initiator, the responder opens its receiver continuously for a full ranging block. If there are several sessions, then it is important that all sessions can have a fair chance to open their receiver for synchronizing with the initiator. In the given example, a key 306 and a mobile device 308 attempt to open the door of a car at the same time. Assuming that the key 306 has a higher priority than the mobile device 308 (e.g., a base priority, BP, of 60 versus a base priority of 30), the car starts finding the key 306 first, which means that the responder in the car should keep its receiver open only for the key 306. If there is any malfunction on the key 306 or the distance is too large, then the responder cannot synchronize with the key 306. Until the responder finally no longer attempts to synchronize with the key 306 or until it has successfully synchronized with the key 306, the mobile device 308 does not have any chance to synchronize with the car.

Now discussed are a communication device and a corresponding method of operating a communication device, which facilitate achieving a more efficient scheduling of ranging sessions of the kind set forth.

Figure 4:
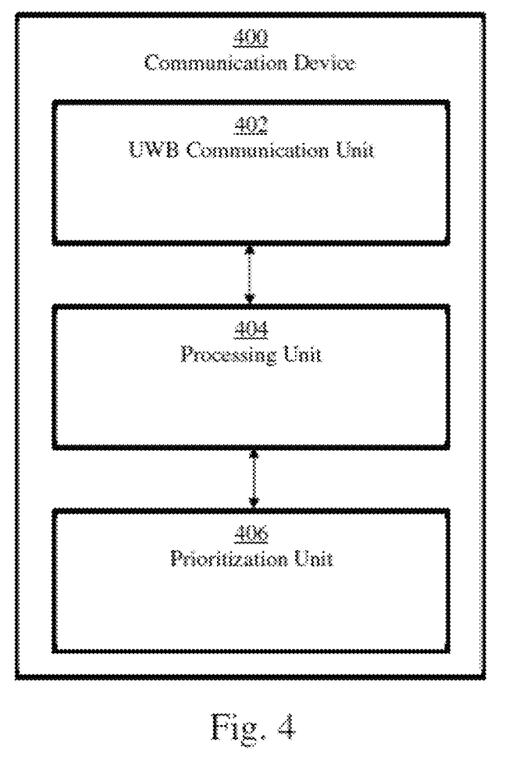
FIG. 4 shows an illustrative embodiment of a communication device.

FIG. 4 shows an illustrative embodiment of a communication device 400. The communication device 400 comprises a UWB communication unit 402, a processing unit 404 and a prioritization unit 406. The skilled person will appreciate that, although the components 402, 404, 406 are shown as separate components, some or all of these components 402, 404, 406 may be combined into a single physical unit. For example, the processing unit 404 and the prioritization unit 406 may be integrated into a single unit. The UWB communication unit 402 is configured to enable UWB communication with at least one external communication device (not shown). Furthermore, the processing unit 404 is configured to perform a ranging session between the communication device 400 and the external communication device. In particular, the ranging session comprises one or more distance measurements based on messages exchanged between the communication device 400 and the external communication device, wherein said messages are exchanged through the UWB communication unit 402. Furthermore, the prioritization unit 406 is configured to prioritize said ranging session using a synchronization indicator associated with said ranging session. By prioritizing the ranging session using a synchronization indicator associated with said ranging session, the ranging session may be scheduled more efficiently.

In one or more embodiments, said synchronization indicator indicates whether or not the ranging session is in a synchronized state. Since the state of the synchronization of the ranging session is taken into account, the efficiency of the scheduling may be further increased. Furthermore, in one or more embodiments, the prioritization unit is configured to increase the priority of the ranging session for a predefined amount of time if the ranging session is not in a synchronized state. Since the priority of the ranging session is changed in dependence on the state of the synchronization of the ranging session, the scheduling efficiency may be further increased. Furthermore, the priority may be increased for a limited amount of time, thereby reducing the risk that other ranging sessions will not be scheduled due to the increased priority of the prioritized session. In a practical implementation, the predefined amount of time corresponds to a predefined amount of blocks of the ranging session. In one or more embodiments, the ranging session is in a synchronized state if the UWB communication unit has received a message with a predefined content from the external communication device, and the ranging session is not in a synchronized state if the UWB communication unit has not received said message. This facilitates distinguishing a synchronized state of the ranging session from an unsynchronized state of the ranging session.

In a practical implementation, the predefined content includes synchronization data preceding a ranging round. These synchronization data may for example include a session identifier and a time reference which can be used on the responder side for predicting the time of the next ranging round. In general, synchronization means that the responder knows when the initiator will send its next message. Before the devices are synchronized, the responder does not know when to expect the ranging exchange of a configured session. After the synchronization message-which may also be referred to as a pre-poll message—has been received the responder is in a synchronized state and knows when to expect the ranging messages. Accordingly, being in a synchronized state typically implies that a ranging round has been successfully started, but it does not imply that a whole ranging sequence (i.e., distance estimation) should have been successfully completely.

In one or more embodiments, the prioritization unit is further configured to prioritize said ranging session using a scheduling indicator associated with said ranging session. In this way, the efficiency of the scheduling may be further increased. In particular, in addition to the synchronization state of the ranging session, the scheduling state of the ranging session may be taken into account, thereby finetuning the scheduling of the ranging session. For instance, the scheduling indicator may indicate whether or not the ranging session has been scheduled in a predefined time window. In one or more embodiments, the prioritization unit is configured to increase the priority of the ranging session for a predefined amount of time if the ranging session has not been scheduled in said predefined time window. Since the priority of the ranging session is changed in dependence on the scheduling state of the ranging session, the scheduling efficiency may be further increased. In a practical implementation, the predefined amount of time corresponds to a predefined amount of blocks of the ranging session. Furthermore, in one or more embodiments, the communication device is configured to act as a responder in a localization system. Thus, by a applying a synchronization-based scheduling scheme, a responder may implement a more efficient scheduling, which ensures that different initiators have the chance to perform ranging sessions with the responder. The responder may be a UWB anchor embedded in a vehicle, for example.

Figure 5:
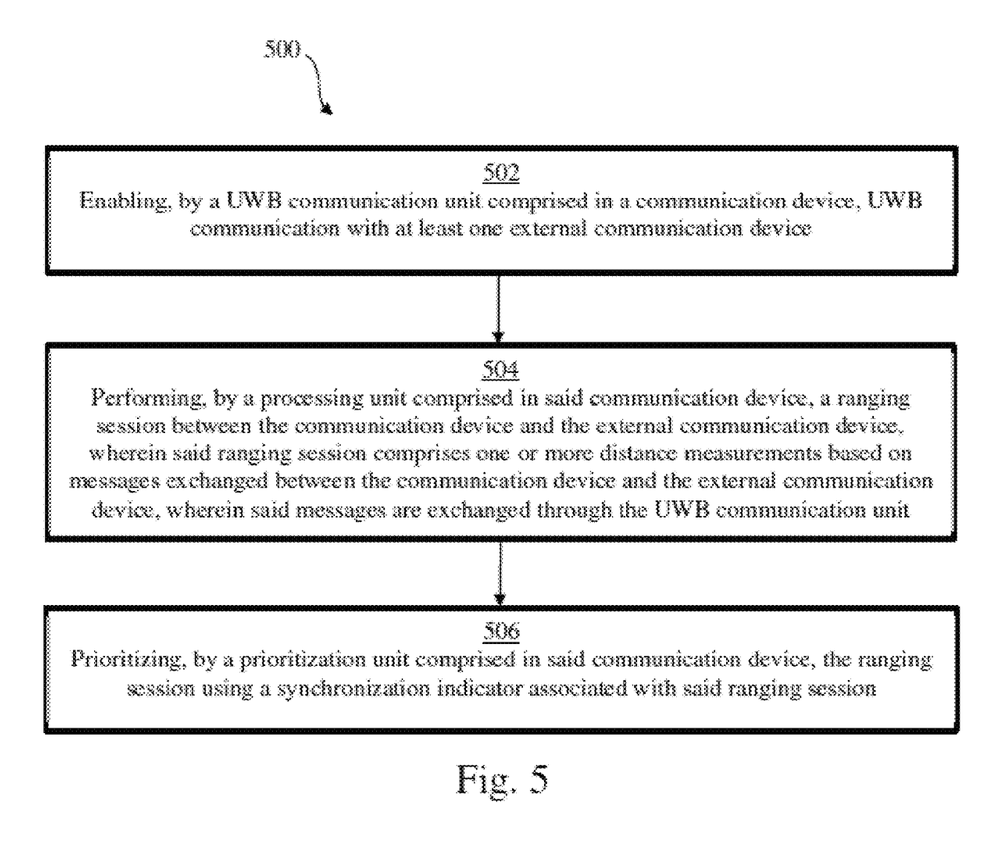
FIG. 5 shows an illustrative embodiment of a method of operating a communication device.

FIG. 5 shows an illustrative embodiment of a method 500 of operating a communication device. The method 500 comprises the following steps. At 502, a UWB communication unit comprised in a communication device enables UWB communication with at least one external communication device. At 504, a processing unit comprised in the communication device performs a ranging session between the communication device and the external communication device. In particular, said ranging session comprises one or more distance measurements based on messages exchanged between the communication device and the external communication device, wherein said messages are exchanged through the UWB communication unit. Furthermore, at 506, a prioritization unit comprised in the communication device prioritizes the ranging session using a synchronization indicator associated with said ranging session. As mentioned above, by prioritizing the ranging session using a synchronization indicator associated with said ranging session, the ranging session may be scheduled more efficiently.

Figure 6:
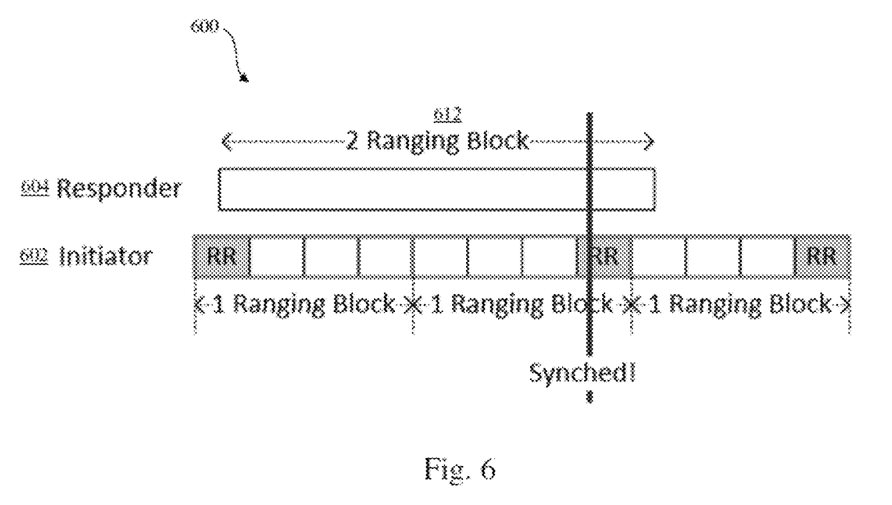
FIG. 6 shows an illustrative embodiment of a minimum duration for finding an initiator.

FIG. 6 shows an illustrative embodiment of a minimum duration 600 for finding an initiator 602. In a practical manner, the presently disclosed dynamic prioritization concept may be implemented as follows, in order to find initiators efficiently during the synchronization phase on the responder side. First, the user may configure a base priority (BP). Then, a dynamic priority may be calculated and reset with the base priority. Furthermore, if the session could not synchronize or has not been scheduled, the dynamic priority of the session may increase in proportion to the base priority. Then, the session which has the highest dynamic priority may be scheduled for a predefined duration. In the present example, the predefined duration is the duration of two ranging blocks 612. This duration may represent the maximum worst-case time needed for the responder 604 to receive a message from the initiator 602. Then, once the session has occupied the two full ranging blocks, the dynamic priority may be reset to the default priority.

Figure 7:
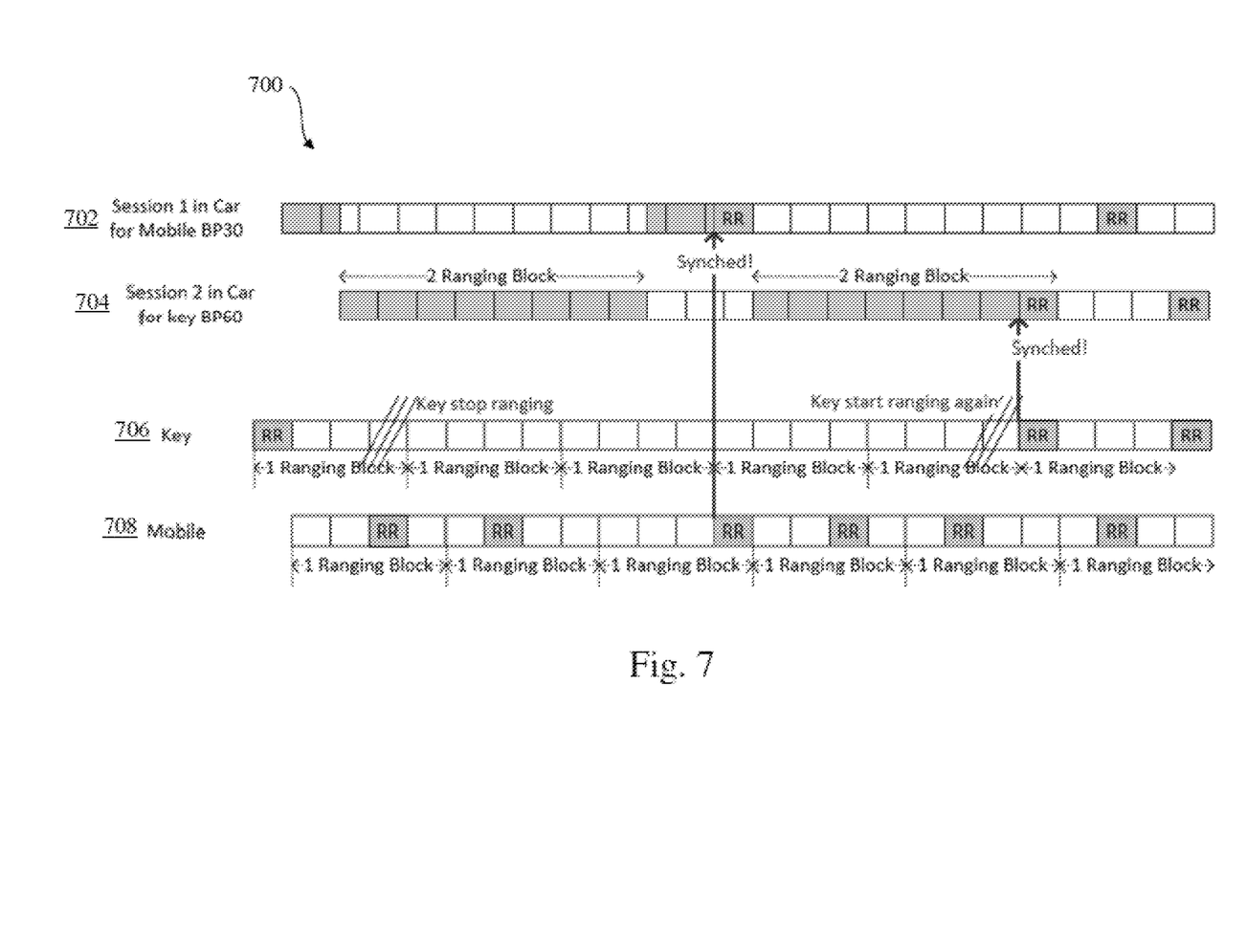
FIG. 7 shows an illustrative embodiment of dynamic priority ranging with multiple sessions.

FIG. 7 shows an illustrative embodiment of dynamic priority ranging 700 with multiple sessions 702, 704. In particular, if the presently disclosed dynamic prioritization concept is applied, the mobile device 708 (with base priority 30) may range with the door of a car even when the car key 706 (with base priority 60), which has a higher priority, has stopped ranging. This leads to a more stable system, which offers a quicker synchronization and thus also a better user experience.

Figure 8:
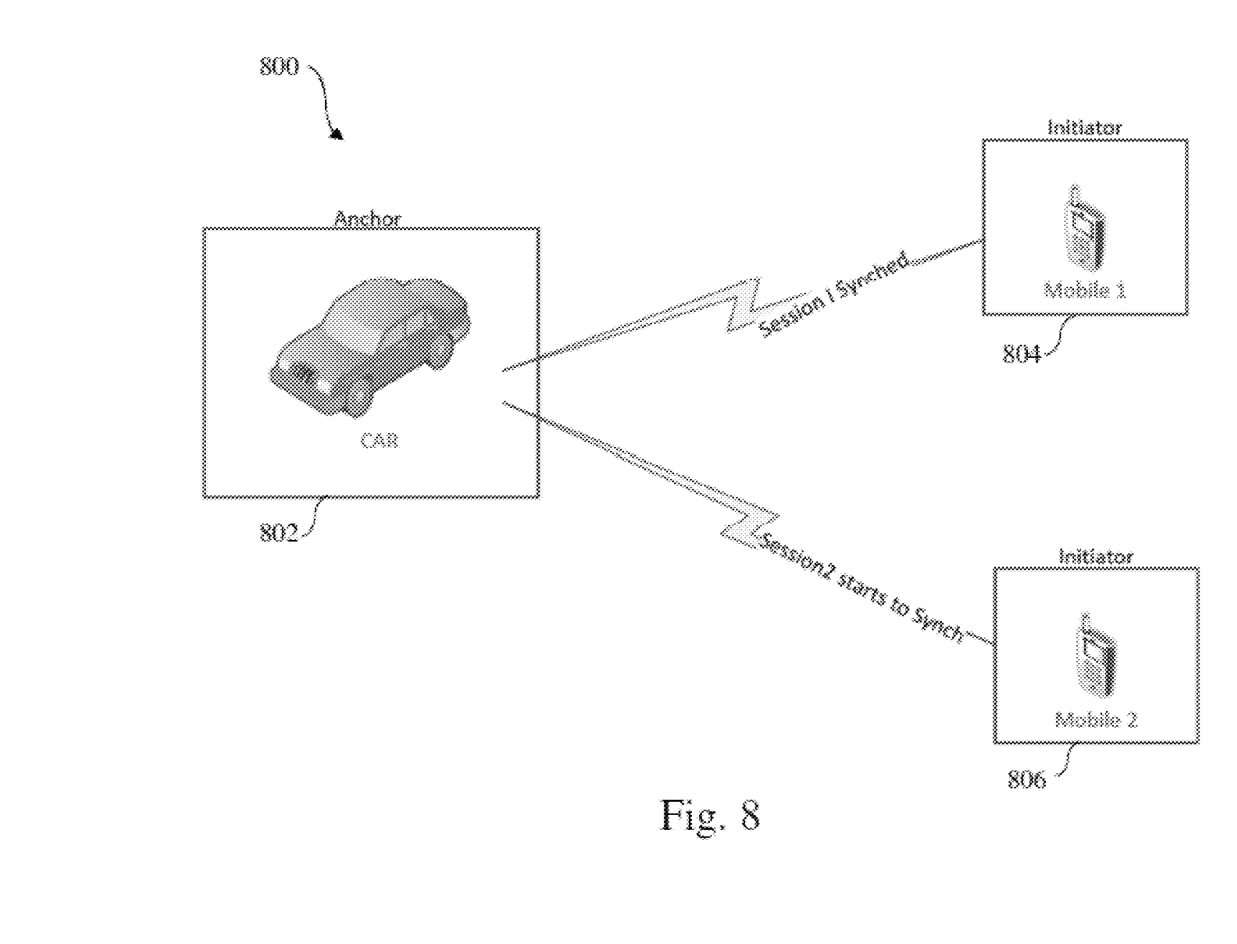
FIG. 8 shows another example of a localization system.

FIG. 8 shows another example of a localization system 800. In particular, in this example two mobile devices 804, 806 are searching for the location of a parked car 802. Mobile 1 804 is already synchronized with the car 802 and keeps tracking the car's location. Later in time, Mobile 2 806 starts trying to find the location of the car with a higher session priority.

Figure 9:
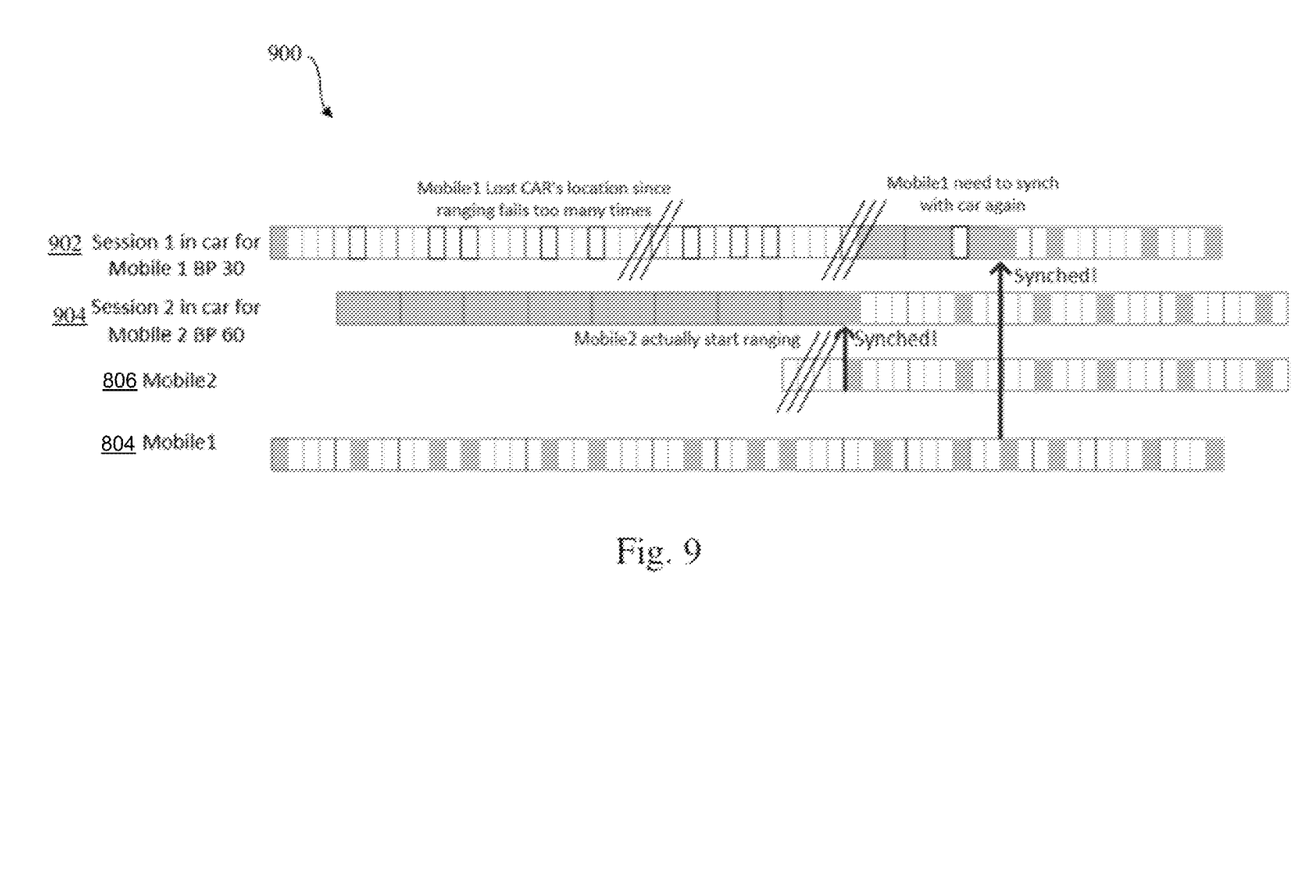
FIG. 9 shows another example of static priority ranging with multiple sessions.

FIG. 9 shows another example of static priority ranging 900 with multiple sessions, 902, 904 in car 802. Once session2 (belonging to Mobile 2 806 with base priority 60) starts to synchronize with car, session 1 (belonging to Mobile 1 804 with base priority 30, which is already ranging) cannot perform ranging until session2 is synchronized with the car or gives up finding the car. This is because session2 with a higher priority is blocking session1. During this time, session1 cannot range with the car too many times. Therefore, session1 has lost the synchronization with the car. And after session2 finishes finding the car, session1 should find the car from scratch again.

Figure 10:
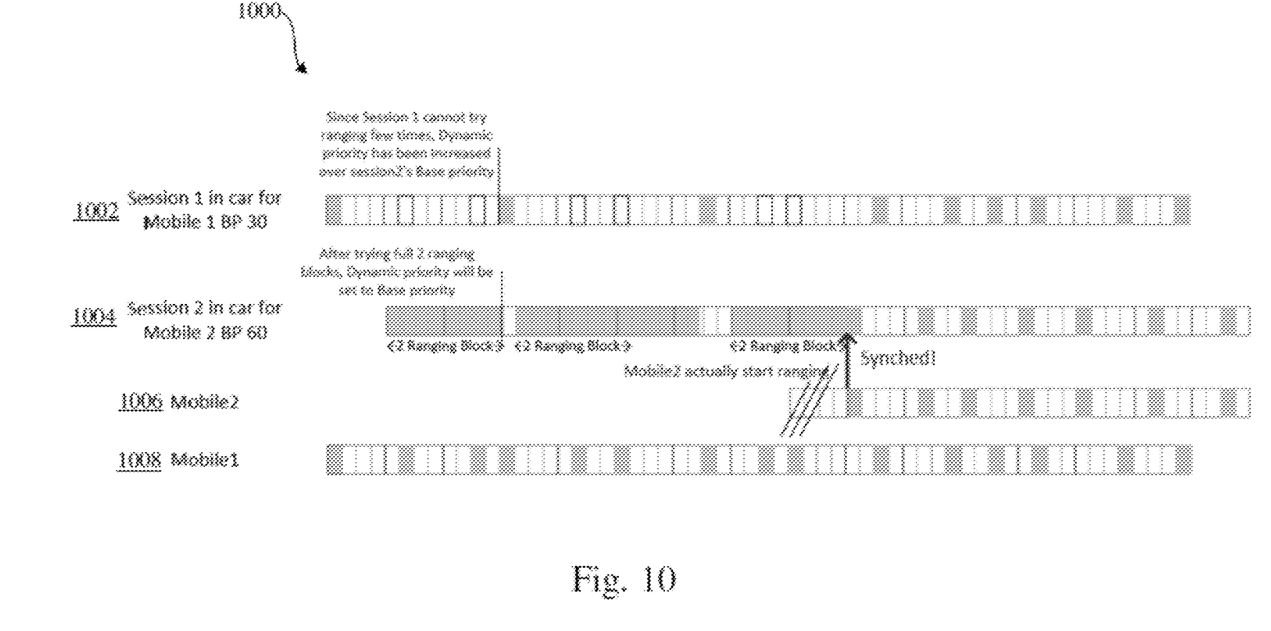
FIG. 10 shows another illustrative embodiment of dynamic priority ranging with multiple sessions.

FIG. 10 shows another illustrative embodiment of dynamic priority ranging 1000 with multiple sessions 1002, 1004. In particular, it is shown that if the presently disclosed prioritization concept is applied to the localization system shown in FIG. 8, the problem described with reference to FIG. 9 may be solved as well. More specifically, once the session 2 1004 on the car tries to find the initiator for more than two consecutive blocks, then its dynamic priority may be reset to the base priority. For every time when session 1 1002 should be scheduled on the car from a protocol perspective, but cannot be scheduled from a priority perspective its dynamic priority increases. Once session 1 1002 has a higher priority than session 2 1004, session 1 1002 overrules session 2 1004 after it has been scheduled for two blocks and thus session 1 1002 can be scheduled, which means that it is also resynchronized. This means that session 1 1002 can be scheduled and resynchronized on a regular basis even if the car has session 2 1004 with a higher priority running, which is not synchronized. For this reason, session 1 1002 stays synchronized and does not need to resynchronize once session 2 1004 is synchronized. So, during the time when session 2 1004 is scheduled in the car, the car tries to find mobile 2 1006, the dynamic priority for session 1 1002 in the car will be increased since it cannot try ranging. Therefore, after session 2 1004 trying two full ranging blocks, the dynamic priority of session 1 1002 is greater than the base priority of session 2 1004. Therefore, mobile 1 1008 can still keep track of the location of the car regularly.

In a practical implementation, the dynamic priority may be calculated based on a preconfigured base priority using the following counters and parameters. A counter CouldntBeScheduledSinceCounter may be increased every ranging block if a session has not been scheduled. This counter may be reset as soon as a session can be scheduled. Furthermore, a counter SyncFailCnt may be increased every ranging block during which ranging is attempted, but no successful synchronization can be performed with the communication counterpart. This counter may be reset when the session can perform a successful ranging.

Furthermore, a parameter PriorityIncrementFactorCouldntBeScheduled may be adjusted to control the speed to increase dynamic priority in case the session cannot be scheduled. Furthermore, a parameter PriorityIncrementFactorCouldntSync may be adjusted to control the speed to increase dynamic priority in case the session cannot be synchronized with the communication counterpart. Using these counters and parameters, the dynamic priority may be calculated by means of the following formula:

Dynamic priority=(1+CouldntBeScheduledSinceCounter/PriorityIncrementFactorCouldntBeScheduled)*BasePriority+SyncFailCnt*(BasePriority/PriorityIncrementFactorCouldntSync)

It is noted that the value of the of the priority increment factors is dependent on the application and can be different from use case to use case in order to achieve a better performance.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 localization system
102 anchor
104 initiators
200 block-based ranging
202 ranging block
204 ranging block
206 ranging block
208 ranging round
210 ranging round
212 ranging round
300 static priority ranging with multiple sessions
302 first ranging session
304 second ranging session
306 key
308 mobile device
400 communication device
402 UWB communication unit
404 processing unit
406 prioritization unit
500 method of operating a communication device
502 enabling, by a UWB communication unit comprised in a communication device, UWB communication with at least one external communication device
504 performing, by a processing unit comprised in said communication device, a ranging session between the communication device and the external communication device, wherein said ranging session comprises one or more distance measurements based on messages exchanged between the communication device and the external communication device, wherein said messages are exchanged through the UWB communication unit
506 prioritizing, by a prioritization unit comprised in said communication device, the ranging session using a synchronization indicator associated with said ranging session
600 minimum duration for finding an initiator
602 initiator
604 responder
700 dynamic priority ranging with multiple sessions
702 first ranging session
704 second ranging session
706 key
708 mobile device
800 localization system
802 anchor
804 initiator
806 initiator
900 static priority ranging with multiple sessions
902 first ranging session
904 second ranging session
906 mobile device
908 mobile device
1000 dynamic priority ranging with multiple sessions
1002 first ranging session
1004 second ranging session
1006 mobile device
1008 mobile device

The invention claimed is:

1. A communication device, comprising:
an ultra-wideband, UWB, communication unit configured to enable UWB communication between the communication device and an external communication device;
a processing unit configured to perform a ranging session between the communication device and the external communication device, wherein the ranging session comprises one or more distance measurements based on messages exchanged between the communication device and the external communication device, wherein the messages are exchanged through the UWB communication unit; and
a prioritization unit configured to prioritize the ranging session by
attempting to synchronize the ranging session by
setting a dynamic priority of the ranging session to a base priority associated with the external communication device,
after setting the dynamic priority to the base priority, making a determination that the dynamic priority should be increased based on one or more of
a synchronization indicator indicating that the ranging session is not in a synchronized state, and
a scheduling indicator indicating that the ranging session has not been scheduled,
when the determination is made that the dynamic priority of the ranging session should be increased, increasing the dynamic priority of the ranging session for a predefined amount of time,
when the predetermined amount of time has elapsed or when the scheduling indicator indicates that the ranging session has been scheduled, resetting the dynamic priority of the ranging session to the base priority; and when the scheduling indicator indicates that the ranging session has been scheduled, performing the ranging session by the processor.

2. The device of claim 1, wherein said synchronization indicator indicates whether the ranging session is in a synchronized state.

3. The device of claim 2, wherein
the communication unit and the external communication device are configured to exchange a ranging request message and a response to the ranging request message that includes a predefined content;
the synchronization indicator indicates that the ranging session is in a synchronized state when the UWB communication unit has received the response message with the predefined content from the external communication device, and
the synchronization indicator indicates that the ranging session is not in a synchronized state when the UWB communication unit has not received the response message.

4. The device of claim 3, wherein the predefined content includes synchronization data preceding a ranging round.

5. The device of claim 1, wherein the predefined amount of time corresponds to a predefined amount of ranging blocks of the ranging session, and wherein when the ranging session is being performed, a ranging round may be performed during each ranging block of the ranging blocks.

6. The device of claim 1, wherein the device is configured to act as a responder in a localization system.

7. The device of claim 1, wherein making the determination that the dynamic priority should be increased includes determining that the synchronization indicator indicates that the ranging session is not in a synchronized state.

8. The device of claim 1, wherein making the determination that the dynamic priority should be increased includes determining that the scheduling indicator associated with the ranging session indicates that the ranging session has not been scheduled within a predefined time window.

9. The device of claim 1, wherein increasing the dynamic priority of the ranging session includes increasing the dynamic priority of the ranging session by a priority increment.

10. The device of claim 1, wherein increasing the dynamic priority of the ranging session includes increasing the dynamic priority of the ranging session multiple times.

11. A method of operating a communication device, comprising:
enabling, by an ultra-wideband, UWB, communication unit of the communication device, UWB communication between the communication device and an external communication device;
attempting, by a processing unit and a prioritization unit of the communication device, to synchronize and perform a ranging session between the communication device and the external communication device, wherein attempting to synchronize and perform the ranging session includes
setting a dynamic priority of the ranging session to a base priority associated with the external communication device,
after setting the dynamic priority to the base priority, making a determination that the dynamic priority should be increased based on one or more of
a synchronization indicator indicating that the ranging session is not in a synchronized state, and
a scheduling indicator indicating that the ranging session has not been scheduled,
when the determination is made that the dynamic priority of the ranging session should be increased, increasing the dynamic priority of the ranging session for a predefined amount of time,
when the predetermined amount of time has elapsed or when the scheduling indicator indicates that the ranging session has been scheduled, resetting the dynamic priority of the ranging session to the base priority; and
when the scheduling indicator indicates that the ranging session has been scheduled, performing, by the processing unit, the ranging session between the communication device and the external communication device, wherein the ranging session comprises one or more distance measurements based on messages exchanged between the communication device and the external communication device, and wherein the messages are exchanged through the UWB communication unit.

12. The method of claim 11, wherein said synchronization indicator indicates whether or not the ranging session is in a synchronized state.

13. The method of claim 12, further comprising:
the communication unit and the external communication device exchanging a ranging request message and a response to the ranging request message that includes a predefined content;
wherein the synchronization indicator indicates that the ranging session is in a synchronized state when the UWB communication unit has received the response message with the predefined content from the external communication device, and
wherein the synchronization indicator indicates that the ranging session is not in a synchronized state when the UWB communication unit has not received the response message.

14. The method of claim 13, wherein the predefined content includes synchronization data preceding a ranging round.

15. The method of claim 11, wherein the predefined amount of time corresponds to a predefined amount of ranging blocks of the ranging session, and wherein when the ranging session is being performed, a ranging round may be performed during each ranging block of the ranging blocks.

16. The method of claim 11, wherein making the determination that the dynamic priority should be increased includes determining that the synchronization indicator indicates that the ranging session is not in a synchronized state.

17. The method of claim 11, wherein making the determination that the dynamic priority should be increased includes determining that the scheduling indicator associated with the ranging session indicates that the ranging session has not been scheduled within a predefined time window.

18. The method of claim 11, wherein increasing the dynamic priority of the ranging session includes increasing the dynamic priority of the ranging session by a priority increment.

19. The method of claim 11, wherein increasing the dynamic priority of the ranging session includes increasing the dynamic priority of the ranging session multiple times.

* * * * *